(12) United States Patent
Ramsey et al.

(10) Patent No.: US 9,535,573 B2
(45) Date of Patent: Jan. 3, 2017

(54) SYSTEMS AND METHODS FOR DYNAMIC LIST VIEWS AND DETAIL PAGES

(75) Inventors: Michael Ramsey, Foster City, CA (US); Rachel Wang, Foster City, CA (US); Jason Ellis, Geneva, IL (US); Reddy Yerradoddi, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 433 days.

(21) Appl. No.: 13/594,576

(22) Filed: Aug. 24, 2012

(65) Prior Publication Data

US 2013/0227479 A1    Aug. 29, 2013

Related U.S. Application Data (60) Provisional application No. 61/528,047, filed on Aug. 26, 2011.

(51) Int. Cl.
*G06F 3/0482* (2013.01)
*G06F 17/30* (2006.01)

(52) U.S. Cl.
CPC ....... *G06F 3/0482* (2013.01); *G06F 17/30368* (2013.01)

(58) Field of Classification Search
CPC .......................... G06F 3/0482; G06F 17/30368
USPC ...................................................... 715/810
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,314,458 B1 * | 11/2001 | Steele et al. .................. 709/219 |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |

(Continued)

OTHER PUBLICATIONS http://web.archive.org/web/20080410195439/http://finance.yahoo.com/.*

*Primary Examiner* — Peiyong Weng
(74) *Attorney, Agent, or Firm* — Dergosits & Noah LLP; Todd A. Noah (57) ABSTRACT

Systems and methods are provided for dynamic list views and detail pages. A database system can update a subscribed field in a data record when the field is updated and when a user interface is displaying the field in a list view. The system can provide a notification of an update for a subscribed field in a data record when the field is updated and when a user interface is displaying the field in a list view.

17 Claims, 7 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0133509 A1* | 9/2002 | Johnston et al. ............. 707/203 |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267741 A1* | 12/2004 | Galindo-Legaria G06F 17/30575 |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2011/0251991 A1* | 10/2011 | Stallman et al. ............. 707/609 |
| 2012/0151363 A1* | 6/2012 | Palmer et al. ................ 715/736 |

* cited by examiner

| | | | Case # | Subject | Status | Priority |
|---|---|---|---|---|---|---|
| o | Edit | Del | 00001076 | This happened | Escalated | Medium |
| o | Edit | Del | 00001075 | It broke on me | Escalated | Medium |
| o | Edit | Del | 00001074 | Isn't working | New | Low |
| | Edit | Del | 00001065 | Tuesday | New | Low |
| | Edit | Del | 00001064 | Tuesday again! | Escalated | High |
| o | Edit | Del | 00001063 | Not a charm | Escalated | Medium |
| o | Edit | Del | 00001062 | Splat | Escalated | Medium |
| o | Edit | Del | 00001061 | Boom | New | Low |
| o | Edit | Del | 00001060 | Bang | New | Low |
| | Edit | Del | 00001059 | Pow | Escalated | High |
| | Edit | Del | 00001058 | Lightning strike | Escalated | High |
| | Edit | Del | 00001057 | Not working | Escalated | High |
| | Edit | Del | 00001056 | Backup failure | Escalated | High |
| | Edit | Del | 00001047 | Keeps tripping | Escalated | High |
| o | Edit | Del | 00001045 | GFCI | New | Medium |
| o | Edit | Del | 00001044 | Modem drops | New | Medium |
| o | Edit | Del | 00001042 | Interruption | New | Medium |
| o | Edit | Del | 00001039 | Reset | New | Low |
| o | Edit | Del | 00001037 | Don't know | New | Medium |
| o | Edit | Del | 00001036 | Help | Escalated | Medium |

| Case Detail | | | |
|---|---|---|---|
| Case owner | Admin User | Entitle process | |
| Case number | 00001065 hierarchy | Entitle name | |
| Case record type | Test record type | Milestone | |
| Contact name | | Contact phone | |
| Visible in portal | | Contact email | |
| Escalated | | Parent case | |
| Account name | | Product | |
| Test | | | |
| Resolution time | | | |
| Test email | | | |
| Additional Info | | | |
| Status | New | Type | |
| Case origin | Web | Case reason | |
| Priority | | | |
| Subject | Tuesday | | |
| Description | rfrwe | | |
| Date/time open | 5/3/2011 11:22 AM | Date/time close | |
| Web email | wang@salesforce.com | Web company | |
| Web name | CHITRA w2C patch | Web phone | |
| System Info | | | |

SYSTEMS AND METHODS FOR DYNAMIC LIST VIEWS AND DETAIL PAGES

CLAIM OF PRIORITY

This application claims the benefit of U.S. Provisional Patent Application 61/528,047 entitled, SYSTEMS AND METHODS FOR DYNAMIC LIST VIEWS AND DETAIL PAGES, by Ramsey et al., filed Aug. 26, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending Patents and Patent Application, including the present application, are related to each other. The other application is incorporated by reference herein in its entirety: U.S. patent application Ser. No. 12/878,894 entitled SERVICE CLOUD CONSOLE, by Casalaina et al., filed Sep. 9, 2010.

PROJECT MANAGEMENT

One or more implementations relate generally to consumer service providers in a computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional database systems provide lists of consumers for consumer service providers, such as call centers. System users can use the consumer lists to make outbound calls for telesales, send emails, or post comments to self-service portals. Users may work from personalized lists of consumers or from a common list of consumers that is accessible to other users. A user interface may display a list view, which is a partial view of a common list that can include thousands of consumers. A user may select to view a detail page that provides details about a consumer listed in a common list. Telesales providers may employ thousands of users who work simultaneously in a highly competitive environment. A first user may have just completed a telesales call with a first consumer listed on a common list, and not realize that a second user is calling a second consumer who is listed on the common list, such that the first user wastes time in preparation for calling the second consumer. A support agent who is working from a common list does not realize that a third consumer on the common list has requested that the third consumer's case be escalated to the highest priority, so the support agent decides to spend time providing email support to a fourth consumer with a lower priority case. A first user viewing a detail page may waste time with conflict resolution or duplication of effort because the first user was unaware of a second user providing updated information for the detail page. The database system could address such challenges by automatically providing instantaneous updates to common lists. However, thousands of immediate updates adding, deleting, and modifying information for consumers on a common list could disorient and confuse a user, who could easily lose their place on the common list. The confused user may not recall the consumers that the user was planning on contacting next, for whom the user may have already spent time preparing to contact these consumers.

Accordingly, it is desirable to provide techniques enabling dynamic list views and detail pages implemented by a database system to improve the performance, efficiency, and the ease of system use for consumer service providers.

BRIEF SUMMARY

In accordance with embodiments, there are provided systems and methods for dynamic list views and detail pages. These systems and methods for dynamic list views and detail pages can provide only the updates for a common list that users are subscribed to receive, only for the consumers that user interfaces are currently displaying, and only how the users specified. Furthermore, embodiments also provide the updates to a detail page based on detail page updates to which users are subscribed, only for the detail page that user interfaces are currently displaying, and only how the users specified. Users may select to receive notifications of updates, rather than the updates themselves, such as the user interface highlighting a data record in yellow to indicate that an update is available for a field in the data record. Embodiments enable database systems to provide user-specified updates for data that a user is currently viewing, thereby enabling the user to be aware of only the updates that the user has identified as relevant and without reducing the user's performance, efficiency, or ease of system use.

In an embodiment and by way of example, a method for dynamic list views and detail pages is provided. The method embodiment includes a database system updating a subscribed field in a data record when the field is updated and when a user interface is displaying the field in a view of a list. A system user can select to subscribe to updates of fields in data records, thereby ensuring that the user receives only the updates that the user selected to receive and when the user selects to view the updates.

While one or more implementations and techniques are described with reference to an embodiment in which dynamic list views and detail pages is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for dynamic list views and detail pages.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing dynamic list views and detail pages will be described with reference to example embodiments.

The following detailed description will first describe updating a subscribed field in a data record when the field is updated and when a user interface is displaying the field in a list view, in accordance with aspects and embodiments. Then providing a notification of an update for a subscribed field in a data record when the field is updated and when a user interface is displaying the field in a list view is then detailed. Then updating a subscribed field in a data record when the field is updated and when a user interface is displaying the field in a detail page is described. Then providing a notification of an update for a subscribed field in a data record when the field is updated and when a user interface is displaying the field in a detail page is described. Next, a screen shot illustrating a frame of an example user interface screen is described.

Figure 1:
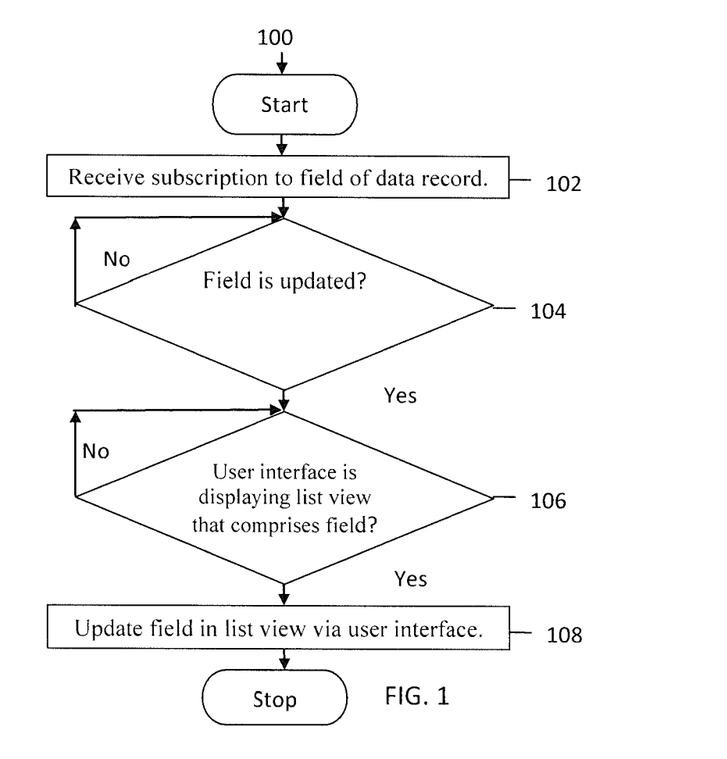
FIG. 1 is an operational flow diagram illustrating a high level overview of a method for dynamic list views and detail pages in an embodiment.

FIG. 1 is an operational flow diagram illustrating a high level overview of a method 100 for dynamic list views and detail pages in an embodiment. As shown in FIG. 1, a database system updates a subscribed field in a data record when the field is updated and when a user interface is displaying the field in a list view.

In block 102, a subscription to a field of a data record is received. For example and without limitation, this can include the database system receiving a subscription to a status field of data records for a specific product. In some embodiments, the subscription is based on an identification of the field by a system user and/or a system administrator. For example, a system administrator may define which fields of which data records a system user may select for subscription. The user's subscriptions may be based on a unique user profile or a common user profile that a user shares with many other users. The common user profile may be based on a specific business process, a specific product, or a specific level of training. For example, a first user is subscribed to a change in a status for cases for a specific product, and a second user is subscribed to a change in a priority for cases for a specific product, such as when a customer representative assigns the highest priority to a case for a customer who threatens to quit if a specific problem is not resolved quickly. Business rules, such as time duration since a case first entered the database system, could escalate the priority for a case. The database system needs to monitor updates for only those fields and data records that the system administrator identified for subscriptions and a user selected for a subscription. The data record may be a custom object, an account object, a campaign object, a case object, a contact object, a lead object, and/or an opportunity object.

In block 104, a determination is made whether a field is updated. By way of example and without limitation, this can include the database system determining whether the status field is updated for a specific product. If the field is updated, the method 100 continues to block 106. If the field is not updated, the method 100 may either terminate or continue to periodically determine whether the field is updated.

In block 106, a determination is made whether a user interface is displaying a list view that includes the field. By way of example and without limitation, this can include the database system determining whether the user interface is displaying the list view that includes the status field for the specific product. If the user interface is displaying the list view that includes the field, the method 100 continues to block 108. If the user interface is not displaying the list view that includes the field, the method 100 may either terminate or continue to periodically determine whether the user interface is displaying the list view that includes the field.

In block 108, a field in a list view is updated via a user interface. In embodiments, this can include the database system updating the status field for the specific product in the list view via the user interface for the subscribed user. A user interface may display a list view in either a horizontal (header) or vertical (sidebar) orientation, and each user may have the option of selecting their own preferred orientation for displaying the list view. Updating the field in the list view may include identifying the field and/or the data record via a modification to the font, color, underline, and/or display constancy for a field. For example, the user interface highlights escalated status fields with bold underlined font in flashing red. Updating the field in the list view may include updating every field in the list view in response to a user request. For example, a user may request that the database system temporarily provide automatic updates to every field in the user's list view. The database system may also discontinue the updating of the field in the list view in response to a user request. For example, a user may request that the database system temporarily provide no updates to any field in the user's list view.

The user interface may insert an additional data record into the list view and identify the additional data record as a new data record for the list view. For example, a first user creates a new data record that meets the criteria for being displayed in a second user's list view, and the user interface updates the second user's list view by inserting the new data record and highlighting the new data record in green to indicate the insertion of the new data record. In another example, the first user creates a new data record that meets the criteria for being displayed in the first user's list view, and the user interface updates the first user's list view by inserting the new data record, but does not highlight the new data record in any color to indicate the insertion because the first user is already aware of their own insertion. In yet another example, the database system modifies an existing data record that did not meet the criteria for being displayed in a user's list view, such that the modified data record now meets the criteria for being displayed in the user's list view. The user interface updates the user's list view by inserting the modified data record and highlighting the modified data record in blue to indicate the insertion of a previously existing data record. The user interface may identify a data record in the list view as a data record that will be deleted from the list view, such as by highlighting the data record in red. The list view may include indicators that indicate which data records in the list view have been accessed since the list view was most recently refreshed or which data records in the list view have yet to be accessed since the list view was most recently refreshed. For example, the user interface displays blue dots in the first column of each data record that has not been accessed since the most recent data refresh. These updates provide the user with only the updates to the list view that the user selected to receive.

The method 100 may be repeated as desired. Although this disclosure describes the blocks 102-108 executing in a particular order, the blocks 102-108 may be executed in a different order.

Figure 2:
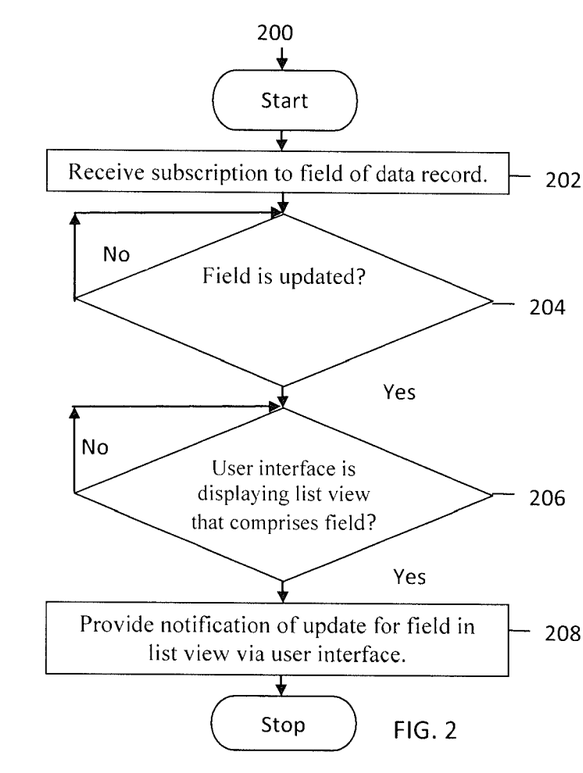
FIG. 2 is an operational flow diagram illustrating a high level overview of another method for dynamic list views and detail pages in an embodiment.

FIG. 2 is another operational flow diagram illustrating a high level overview of a method 200 for dynamic list views and detail pages in an embodiment. As shown in FIG. 2, the database system provides a notification of an update for a subscribed field in a data record when the field is updated and when a user interface is displaying the field in a view of a list. Blocks 202-206 in FIG. 2 are substantially similar to blocks 102-106 in FIG. 1.

In block 202, a subscription to a field of a data record is received. For example and without limitation, this can include the database system receiving a subscription to a status field of data records for a specific product.

In block 204, a determination is made whether a field is updated. By way of example and without limitation, this can include the database system determining whether the status field is updated for the data records for the specific product. If the field is updated, the method 200 continues to block 206. If the field is not updated, the method 200 may either terminate or continue to periodically determine whether the field is updated.

In block 206, a determination is made whether a user interface is displaying a list view that includes the field. By way of example and without limitation, this can include the database system determining whether a user interface is displaying the list view that includes the field for the data records for the specific product. If the user interface is displaying the list view that includes the field, the method 200 continues to block 208. If the user interface is not displaying the list view that includes the field, the method 200 may either terminate or continue to periodically determine whether the user interface is displaying the list view that includes the field.

In block 208, a notification of an update for a field in a list view is provided via a user interface. In embodiments, this can include the database system providing a notification of an update for the status field for data records for a specific product in the list view via the user interface. Rather than updating any fields displayed by the user interface, the database system provides a notification message that the user interface displays on the list view, either in a specific area designated for such messages or overlaid on the displayed fields and data records. A notification of an update, instead of an update, enables a user to become aware of when subscribed fields need to be updated, and permits the user to select the time when the updates are displayed. The notification of the update for the field in the list view may include an option to refresh data fields in the list view. For example, the notification message may specify that "You have an update" for either a field or a data record that includes the field, and include a "refresh" button that initiates the display of the update when selected by the user. These updates enable the user to receive only the updates to the list view that the user selected to receive and only when the user selects to view the updates to the list view.

The method 200 may be repeated as desired. Although this disclosure describes the blocks 202-208 executing in a particular order, the blocks 202-208 may be executed in a different order.

Figure 3:
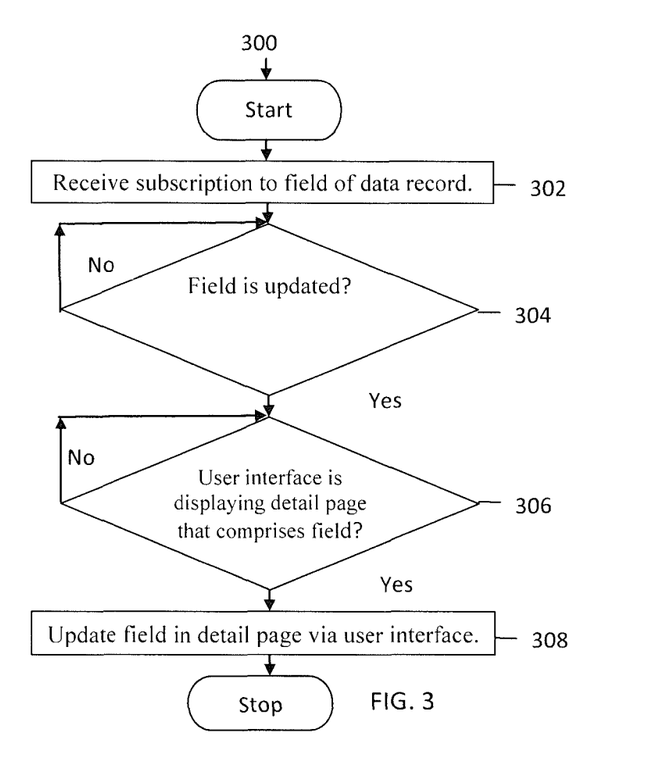
FIG. 3 is an operational flow diagram illustrating a high level overview of yet another method for dynamic list views and detail pages in an embodiment.

FIG. 3 is yet another operational flow diagram illustrating a high level overview of a method 300 for dynamic list views and detail pages in an embodiment. As shown in FIG. 3, the database system updates a subscribed field in a data record when the field is updated and when a user interface is displaying the field in a view of a list.

In block 302, a subscription to a field of a data record is received. For example and without limitation, this can include the database system receiving a subscription to a case owner field of a detail page.

In block 304, a determination is made whether a field is updated. By way of example and without limitation, this can include the database system determining whether the case owner field for the detail page is updated. If the field is updated, the method 300 continues to block 306. If the field is not updated, the method 300 may either terminate or continue to periodically determine whether the field is updated.

In block 306, a determination is made whether a user interface is displaying a detail page that includes the field. By way of example and without limitation, this can include the database system determining whether the user interface is displaying the detail page that includes the case owner field. In contrast, blocks 106 and 206 determined whether the user interface is displaying the list view, not the detail page, which includes the status field. If the user interface is displaying the detail page that includes the field, the method 300 continues to block 308. If the user interface is not displaying the detail page that includes the field, the method 300 may either terminate or continue to periodically determine whether the user interface is displaying the detail page that includes the field.

In block 308, a field in a detail page is updated via a user interface. In embodiments, this can include the database system updating the case owner field in the detail page via the user interface. Updating the field in the detail page may include identifying the field and/or the data record via a modification to the font, color, underline, and/or display constancy. For example, the user interface highlights the updated case owner field with bold underlined font in flashing red. Updating the field in the detail page may include updating every field in the detail page in response to a user request. For example, a user may request that the database system temporarily provide automatic updates to every field in the user's currently viewed detail page. The database system may also discontinue the updating of the field in the detail page in response to a user request. For example, a user may request that the database system temporarily provide no updates to any field in the user's currently viewed detail page. These updates enable the user to receive only the updates that the user selected to receive for the detail pages.

The method 300 may be repeated as desired. Although this disclosure describes the blocks 302-308 executing in a particular order, the blocks 302-308 may be executed in a different order.

Figure 4:
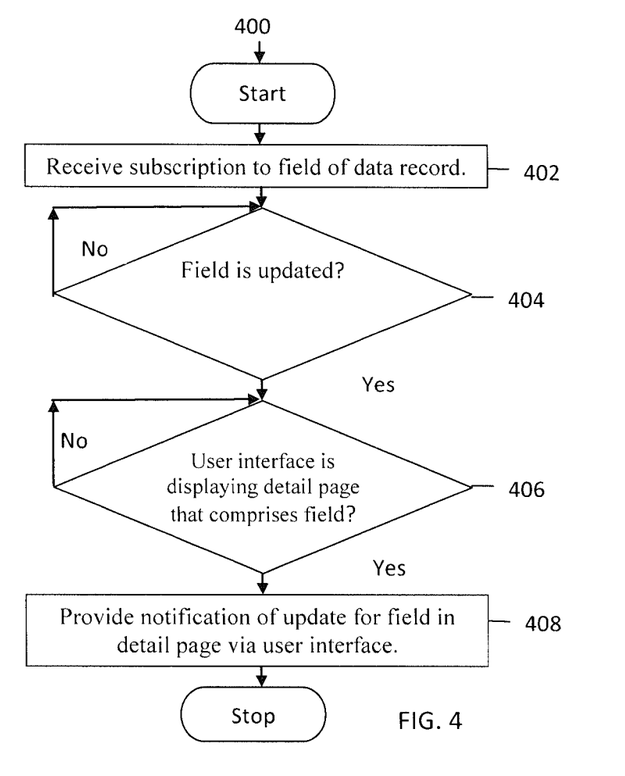
FIG. 4 is an operational flow diagram illustrating a high level overview of a further method for dynamic list views and detail pages in an embodiment.

FIG. 4 is a further operational flow diagram illustrating a high level overview of a method 400 for dynamic list views and detail pages in an embodiment. As shown in FIG. 4, the database system provides a notification of an update for a subscribed field in a data record when the field is updated and when a user interface is displaying the field in a detail page. Blocks 402-406 in FIG. 4 are substantially similar to blocks 302-306 in FIG. 3.

In block 402, a subscription to a field of a data record is received. For example and without limitation, this can include the database system receiving a subscription to a case owner field of a detail page.

In block 404, a determination is made whether a field is updated. By way of example and without limitation, this can include the database system determining whether the case owner field is updated. If the field is updated, the method 400 continues to block 406. If the field is not updated, the method 400 may either terminate or continue to periodically determine whether the field is updated.

In block 406, a determination is made whether a user interface is displaying a detail page that includes the field. By way of example and without limitation, this can include the database system determining whether the user interface is displaying the detail page that includes the case owner field. If the user interface is displaying the detail page that includes the field, the method 400 continues to block 408. If the user interface is not displaying the detail page that includes the field, the method 400 may either terminate or continue to periodically determine whether the user interface is displaying the detail page that includes the field.

In block 408, a notification of an update for a field in a detail page is provided via a user interface. In embodiments, this can include the database system providing a notification of an update for the case owner field in the detail page via the user interface. Rather than updating any fields displayed by the user interface, the database system provides a notification message that the user interface displays on the detail page, either in a specific area designated for such messages or overlaid on the displayed fields and data records. A notification of an update, instead of an update, enables a user to become aware of when subscribed fields need to be updated, and permits the user to select the time when the updates are displayed. Providing the notification of the update for the field in the detail page may include providing an option to refresh data fields in the list view. For example, the notification message may specify that "You have an update" for either a field or a data record that includes the field, and include a "refresh" button that initiates the display of the update when selected by the user. These updates enable the user to receive only the updates to the detail pages that the user selected to receive and when only the user selects to view the updates to the detail pages.

The method 400 may be repeated as desired. Although this disclosure describes the blocks 402-408 executing in a particular order, the blocks 402-408 may be executed in a different order.

Figure 5:
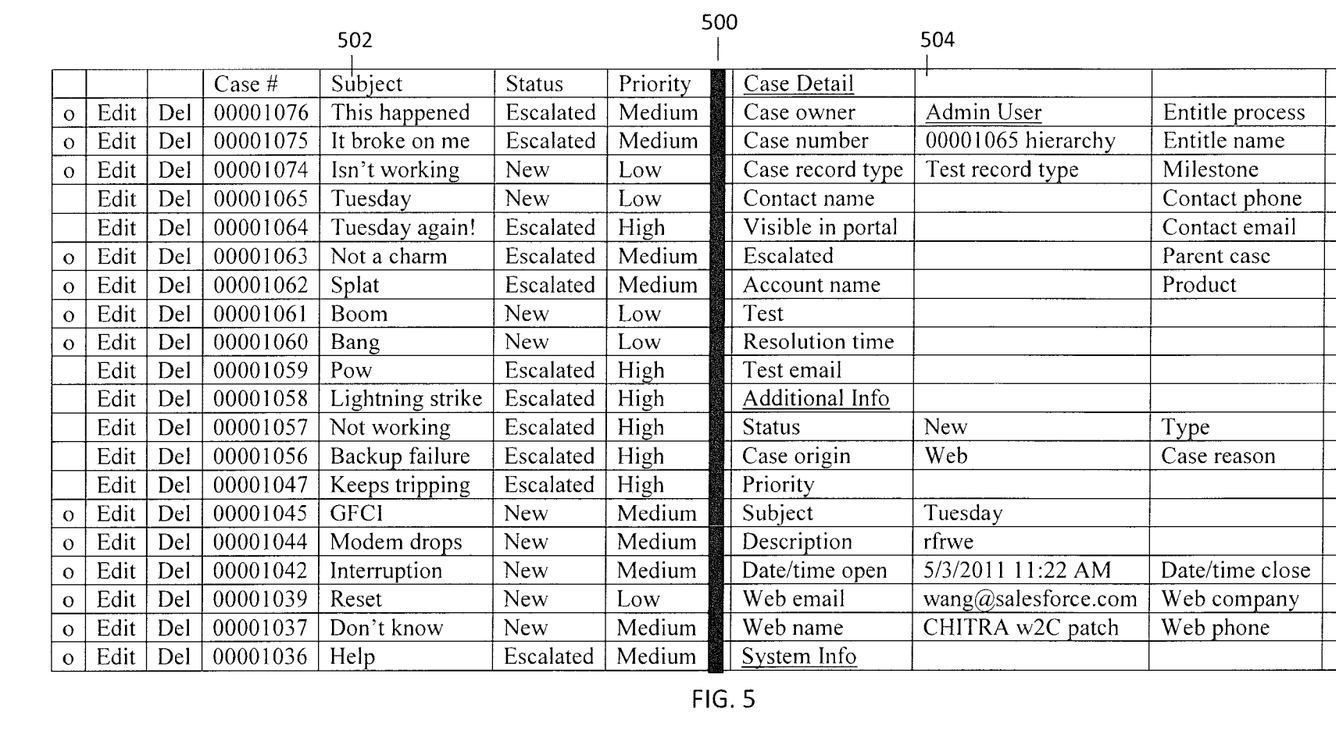
FIG. 5 is a screen shot illustrating a frame of an example user interface screen supporting methods for dynamic list views and detail pages.

FIG. 5 is a screen shot illustrating a frame 500 of an example user interface screen for dynamic list views and detail pages in an embodiment. Frame 500 may include a list view 502 section and a details page 504 section for a consumer service provider.

The list view 502 section lists the case number, the corresponding subject, the corresponding status and the corresponding priority for each of the consumers' cases displayed in a user's view of a common list of consumers. The user may select the case number for a listed case to review the detail page information for the selected case, such as the details page 504 for the case number 00001065. The user may also select the corresponding "Edit" field or "Del" field to edit or delete the corresponding case.

The details page 504 section lists the detailed information for a case selected from the list view 502 section, such as the case number 00001065. The detailed information in the details page 504 section may include the case owner, the user responsible for the case, the case origin, the source of the case, date/time open, when the case entered the database system, contact information, such as email address or phone number, and other information that may be helpful for the user. The user may also select to edit the case, delete the case, close the case, clone the case, or share the case with another user.

The frame 500 may be part of a larger display screen that includes fields for users to enter commands to create, retrieve, edit, and store data records. The database system may output a display screen that includes the frame 500 in response to a search based on search criteria input via a user interface. For example, a system user may request to review the cases for a specific product.

Because the frame 500 is a sample, the frame 500 could vary greatly in appearance. For example, the relative sizes and positioning of the text is not important to the practice of the present disclosure. The frame 500 can be depicted by any visual display, but is preferably depicted by a computer screen. The frame could also be output as a report and printed or saved in electronic format, such as PDF. The frame 500 can be part of a personal computer system and/or a network, and operated from system data received by the network, and/or on the Internet. The frame 500 may be navigable by a user. Typically, a user can employ a touch screen input or a mouse input device to point-and-click to a location on the frame 500 to manage the text on the frame 500, such as a selection that enables a user to edit the text. Alternately, a user can employ directional indicators, or other input devices such as a keyboard. The text depicted by the frame 500 is an example, as the frame 500 may include a much greater amount of text. The frame 500 may also include fields in which a user can input textual information.

System Overview

Figure 6:
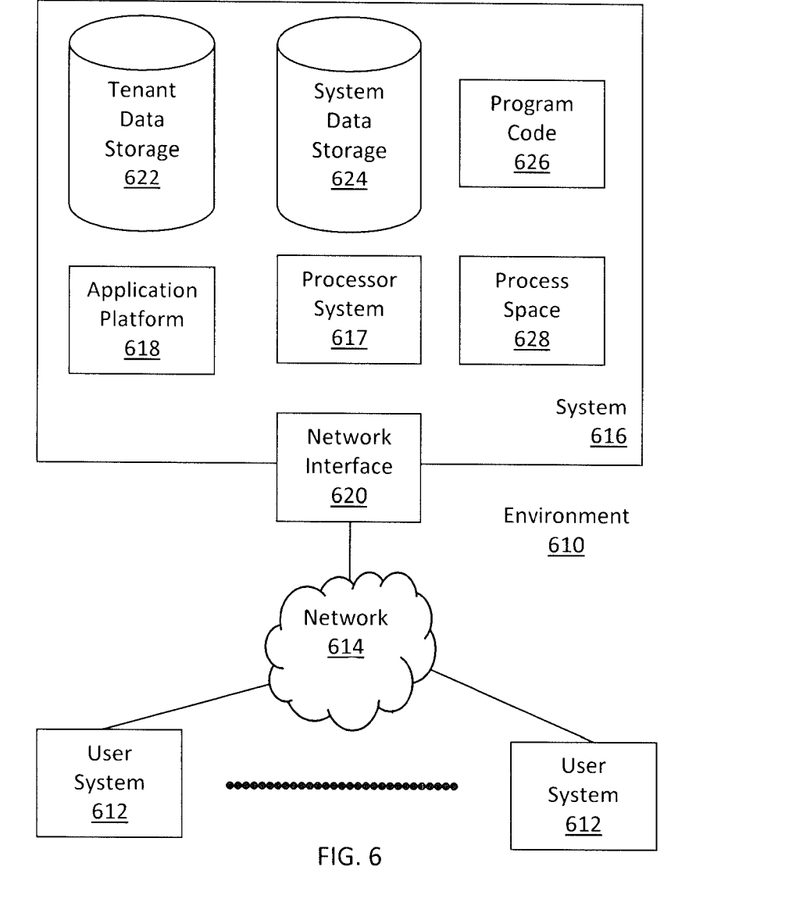
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 18, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP)

enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
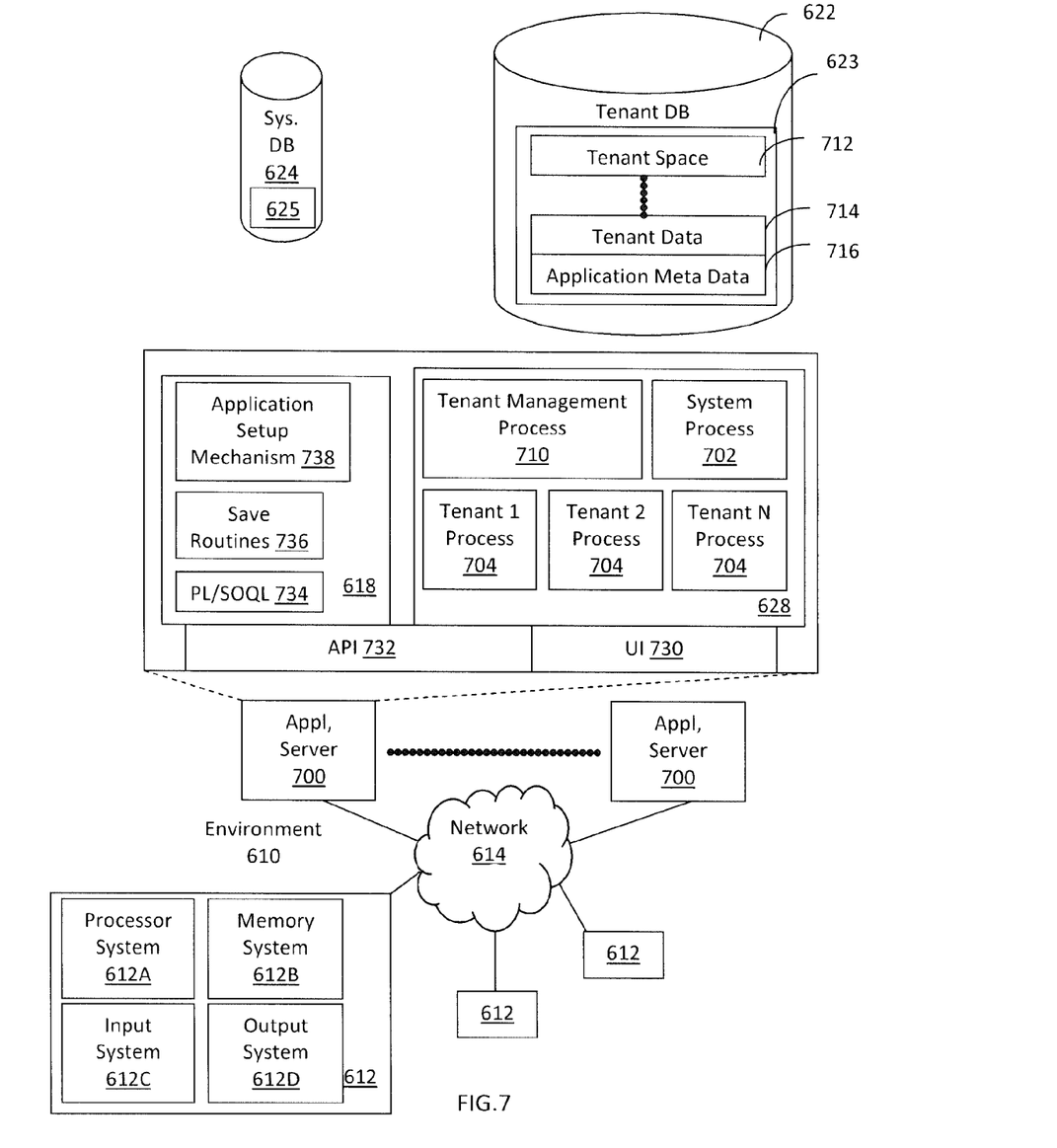
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 10001-1000N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus comprising:
    a database system having one or more computer processors; and
    a non-transitory computer readable medium storing a plurality of instructions, which when executed, cause the one or more processors to:
    identify, by the database system, a field of a data record stored in a database that may be selected for a subscription update to be presented for display on a user interface of at least one computing device coupled to the database system, the data record including the identified field and a plurality of fields not identified for subscription;
    receive, by a database system, a subscription to the identified field of the data record;
    determine, by the database system, whether the subscribed field has been updated;
    monitor, by the database system, in response to a determination that the subscribed field has been updated, the user interface displayed by the at least one computing device, to determine whether the user interface is displaying the subscribed field in a list view, the list view including displayed fields and data records; and
    cause, by the database system, a notification of the update to the subscribed field to be displayed in the user interface when the database system determines that the subscribed field is being displayed the user interface, the notification being overlaid on the displayed fields and data records and including an option to refresh the subscribed data field on the user interface.

2. The apparatus of claim 1, wherein the data record including the subscribed field is associated with at least one of a custom object, an account object, a campaign object, a case object, a contact object, a lead object, and an opportunity object.

3. The apparatus of claim 1, wherein the subscribed field is being displayed in a list view.

4. The apparatus of claim 3, wherein the list view comprises indicators that indicate at least one of which data records in the list view have been accessed since the list view was most recently refreshed and which data records in the list view have yet to be accessed since the list view was most recently refreshed.

5. The apparatus of claim 1, wherein updating the subscribed field comprises identifying the subscribed field via a modification to at least one of a font, a color, an underline, and a display constancy.

6. The apparatus of claim 1, wherein refreshing the subscribed data field comprises identifying the data record including the subscribed field via a modification to at least one of a font, a color, an underline, and a display constancy.

7. The apparatus of claim 3, wherein updating the subscribed field in the list view further comprises updating every field in the list view in response to a user request.

8. The apparatus of claim 1, wherein the instructions, when executed, further cause the one or more processors to discontinue the updating of the subscribed field in response to a user request.

9. The apparatus of claim 3, wherein the instructions, when executed, further cause the one or more processors to insert an additional data record into the list view and identifying the additional data record as a new data record for the list view.

10. The apparatus of claim 3, wherein the instructions, when executed, further cause the one or more processors to identify another data record in the list view as a data record to be deleted from the list view.

11. A non-transitory machine-readable medium carrying one or more sequences of instructions, which instructions, when executed by one or more processors, cause the one or more processors to:
    identify, by the database system, a field of a data record stored in a database that may be selected for a subscription update to be presented for display on a user interface of at least one computing device coupled to the database system, the data record including the identified field and a plurality of fields not identified for subscription;
    receive, by a database system, a subscription to the identified field of the data record;
    determine, by the database system, whether the subscribed field has been updated;
    monitor, by the database system, in response to a determination that the subscribed field has been updated, the user interface displayed by the at least one computing device, to determine whether the user interface is displaying the subscribed field in a list view, the list view including displayed fields and data records; and
    cause, by the database system, a notification of the update to the subscribed field to be displayed in the user interface when the database system determines that the subscribed field is being displayed the user interface, the notification being overlaid on the displayed fields and data records and including an option to refresh the subscribed data field on the user interface.

12. A method comprising:
    identifying, by the database system, a field of a data record stored in a database that may be selected for a subscription update to be presented for display on a user interface of at least one computing device coupled to the database system, the data record including the identified field and a plurality of fields not identified for subscription;

receiving, by a database system, a subscription to the identified field of the data record;

determining, by the database system, whether the subscribed field has been updated;

monitoring, by the database system, in response to a determination that the subscribed field has been updated, the user interface displayed by the at least one computing device, to determine whether the user interface is displaying the subscribed field in a list view, the list view including displayed fields and data records; and causing, by the database system, a notification of the update to the subscribed field to be displayed in the user interface when the database system determines that the subscribed field is being displayed the user interface, the notification being overlaid on the displayed fields and data records and including an option to refresh the subscribed data field on the user interface.

13. The method of claim 12, wherein updating the subscribed field comprises identifying the subscribed field via a modification to at least one of a font, a color, an underline, and a display constancy.

14. The method of claim 12, wherein refreshing the subscribed data field comprises identifying the data record including the subscribed field via a modification to at least one of a font, a color, an underline, and a display constancy.

15. The method of claim 12, wherein updating the subscribed field further comprises updating every field in response to a user request.

16. The apparatus of claim 1, wherein the subscribed field is being displayed in a detail page.

17. The method of claim 12, wherein the subscribed field is being displayed in a detail page.

* * * * *